United States Patent
Fujita et al.

(10) Patent No.: US 9,377,093 B2
(45) Date of Patent: Jun. 28, 2016

(54) BALL SCREW AND POWER STEERING APPARATUS

(71) Applicant: Showa Corporation, Gyoda-shi (JP)

(72) Inventors: Hiroshi Fujita, Haga-gun (JP); Ryota Ito, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/340,103

(22) Filed: Jul. 24, 2014

(65) Prior Publication Data

US 2015/0151780 A1 Jun. 4, 2015

(30) Foreign Application Priority Data

Nov. 29, 2013 (JP) ................. 2013-248334

(51) Int. Cl.
*B62K 19/30* (2006.01)
*F16H 25/22* (2006.01)
*B62D 5/04* (2006.01)

(52) U.S. Cl.
CPC .......... *F16H 25/2219* (2013.01); *B62D 5/0448* (2013.01); *Y10T 74/18576* (2015.01); *Y10T 74/19772* (2015.01)

(58) Field of Classification Search
CPC .................................... F16H 25/2219
USPC ................................. 180/443, 444
See application file for complete search history.

(56) References Cited

U.S. PATENT DOCUMENTS

2007/0204711 A1\* 9/2007 Budaker et al. ........... 74/388 PS
2010/0236345 A1\* 9/2010 Miyahara et al. .......... 74/424.83

FOREIGN PATENT DOCUMENTS

JP 2012-154437 A 8/2012

\* cited by examiner

*Primary Examiner* — Joseph Rocca
*Assistant Examiner* — Felicia L Brittman
(74) *Attorney, Agent, or Firm* — Leason Ellis LLP (57) ABSTRACT

A ball screw includes: an end deflector; and a nut having a housing portion in which the end deflector is housed; in which the end deflector is formed of two or more division members, and at least one of the division members includes a protruding portion that contacts a wall surface forming the housing portion.

14 Claims, 10 Drawing Sheets

BALL SCREW AND POWER STEERING APPARATUS

CROSS-REFERENCE TO RELATED APPLICATIONS

This application is based on and claims priority under 35 USC 119 from Japanese Patent Application No. 2013-248334 filed on Nov. 29, 2013, the entire content of which is incorporated herein by reference.

BACKGROUND OF THE INVENTION

1. Technical Field

The present invention relates to a ball screw and a power steering apparatus.

2. Related Art

As a ball screw circulation type, an end deflector type is known. In this method, a circulation path through which a ball is circulated is formed in a nut. The nut has, at respective opposite ends thereof, end deflectors having a function to scoop the ball from a spiral groove in the nut into the circulation path or to return the ball from the circulation path to the spiral groove in the nut.

Patent Literature 1 (JP-A-2012-154437) discloses a ball screw including an end deflector of a two-division structure.

The end deflector is mounted in the nut by being housed in a housing portion formed in the nut. In this case, when there is backlash between the end deflector and the housing portion or between division components if the end deflector has a divided structure, the backlash may cause noise or increased friction with the ball.

To suppress the backlash in a structure where the end deflector is placed in the housing portion by press fitting, the end deflector may be more tightly press-fitted into the housing portion for housing. However, this presents a problem in that workability during assembly is deteriorated.

SUMMARY OF THE INVENTION

The present invention has been made in order to solve these problems, and an object thereof is to provide a ball screw which restrains the end deflector from being loosened and which allows the end deflector to be more appropriately assembled in the nut, and an electric power steering apparatus including the ball screw.

To accomplish the object, an embodiment of the present invention provides a ball screw including an end deflector, and a nut having a housing portion in which the end deflector is housed, in which the end deflector is formed of two or more division members, and at least one of the division members includes a protruding portion that contacts a wall surface forming the housing portion.

The ball screw allows the protruding portion and the wall surface of the housing portion to contact each other, reducing looseness of the end deflector. Only small contact resistance is produced between the protruding portion and the wall surface of the housing portion, allowing the end deflector to be appropriately assembled in the housing portion.

Furthermore, an embodiment of the present invention may provide the end deflector is press-fitted in the housing portion along a nut axis direction, and the protruding portion is formed on a side surface of the end deflector and outward relative to a center of the end deflector in the nut axis direction.

The protruding portion of the end deflector contacts the wall surface of the housing portion. Thus, assuming that the protruding portion is formed on the side surface of the end deflector and inward in the nut axis direction, the protruding portion and the wall surface of the housing portion contact each other for an increased time during the press fitting of the end deflector. This leads to corresponding increased press fit resistance, which hinders an operator from performing an assembly operation. In contrast, when the protruding portion is formed outward relative to the center of the end deflector in the nut axis direction, the contact time can be reduced. This correspondingly reduces the time for which the end deflector meets with the press fit resistance, leading to improved assembly.

Furthermore, according to an embodiment of the present invention may provide the protruding portion is a projection integrally formed on the end deflector.

The ball screw allows the protruding portion to be formed during molding of the end deflector and thus easily provided.

Furthermore, according to an embodiment of the present invention may provide the protruding portion is a rubber member provided on the end deflector.

The ball screw allows the protruding portion to be easily additionally provided on an end deflector of an existing design.

Furthermore, an embodiment of the present invention may provide a power steering apparatus including the ball screw and an assist motor that supplements an operator's operating force applied to a steering wheel, in which the assist motor rotates the nut to axially move a threaded shaft.

The power steering apparatus allows the protruding portion and the wall surface of the housing portion to contact each other, reducing the looseness of the end deflector. Furthermore, only small contact resistance is produced between the protruding portion and the wall surface of the housing portion, allowing the end deflector to be appropriately assembled in the housing portion.

The embodiments of the present invention restrain the end deflector from being loosened and allow the end deflector to be more appropriately assembled in the nut.

DETAILED DESCRIPTION OF THE INVENTION

Figure 1:
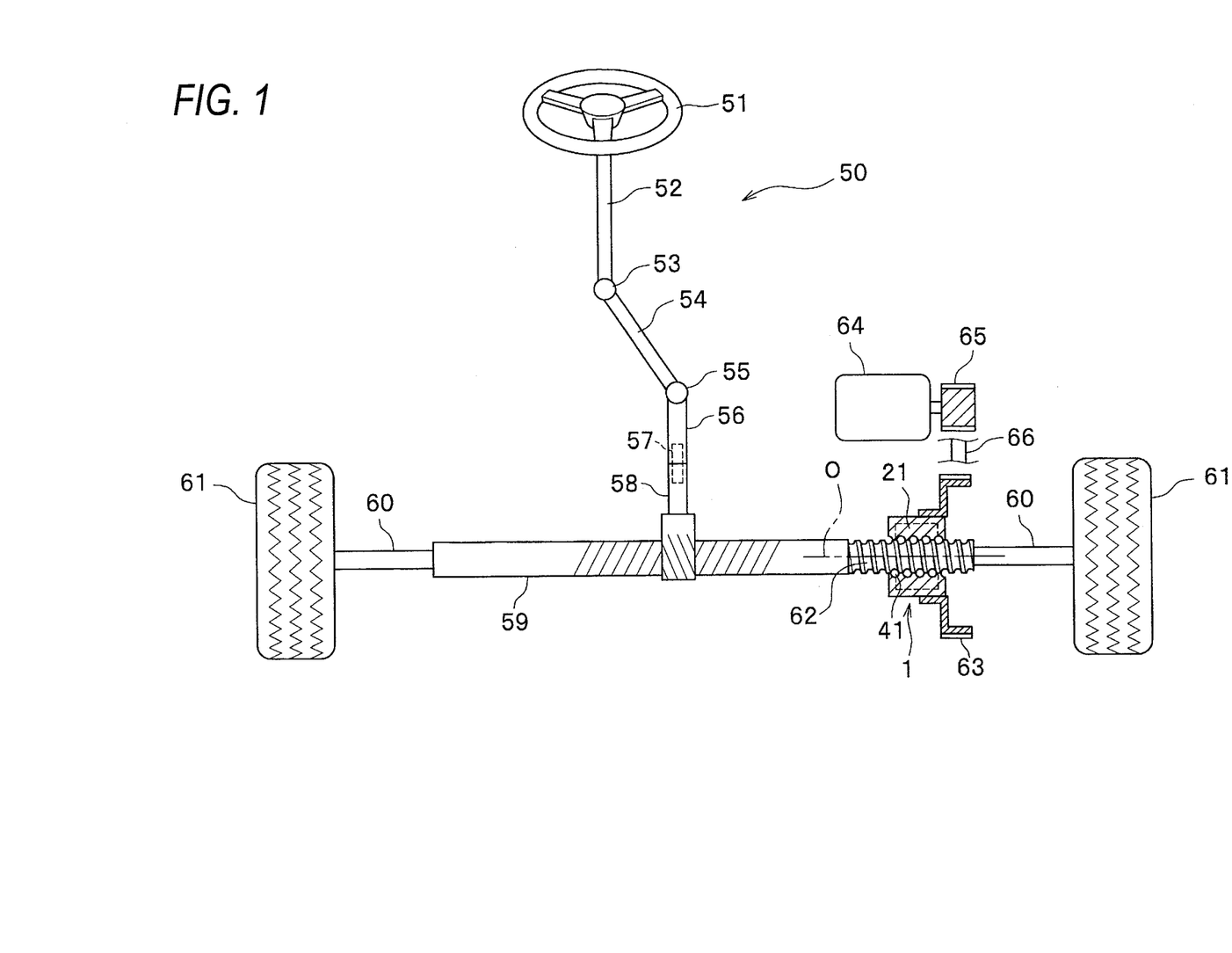
FIG. 1 is a diagram showing a general configuration of an example of a power steering apparatus.

As shown in, for example, FIG. 1, a ball screw 1 according to the present invention is used for a rack assist power steering apparatus 50. The power steering apparatus 50 as an example includes a steering wheel 51 operated by an operator, a steering shaft 52 integrally coupled to the steering wheel 51, an upper coupling shaft 54 coupled to the steering shaft 52 via a universal joint 53, a lower coupling shaft 56 coupled to the upper coupling shaft 54 via a universal joint 55, a pinion shaft 58 coupled to the lower coupling shaft 56 via a torsion bar 57 and including a pinion formed on a lower portion of the pinion shaft 58, and a rack shaft 59 including rack teeth that engage with the pinion and a right and a left front wheels 61 coupled to opposite ends of the rack shaft 59 via tie rods 60.

Between the rack shaft 59 and one of the tie rods 60, a threaded shaft 62 is mounted integrally with the rack shaft 59. The ball screw 1 is mounted on the threaded shaft 62. A driven pulley 63 is axially mounted on an outer periphery of a nut 21 of the ball screw 1. A transmission belt 66 is passed between the driven pulley 63 and a driving pulley 65 axially mounted on an output shaft of an assisting electric motor 64.

In the power steering apparatus 50 configured as described above, a torque applied to the steering wheel 51 is detected by a torque sensor (not shown in the drawings). In accordance with the detected torque, a motor 64 is controllably driven by a control apparatus (not shown in the drawings). Thus, the torque generated by the motor 64 is transmitted, as a complementary force for an operator's operating force applied to the steering wheel 51, to the rack shaft 59 via the ball screw 1 and a belt transmission mechanism formed of the driving pulley 65, the transmission belt 66, and the driven pulley 63.

The ball screw 1 according to the present invention can also be used for an electric power steering apparatus of what is called a steer by wire type including an assist motor and a reaction force actuator electrically connected to the assist motor and providing a driver with a feeling of operation during operation of the steering wheel.

The ball screw 1 will be described below in detail.

"First Embodiment"

Figure 2:
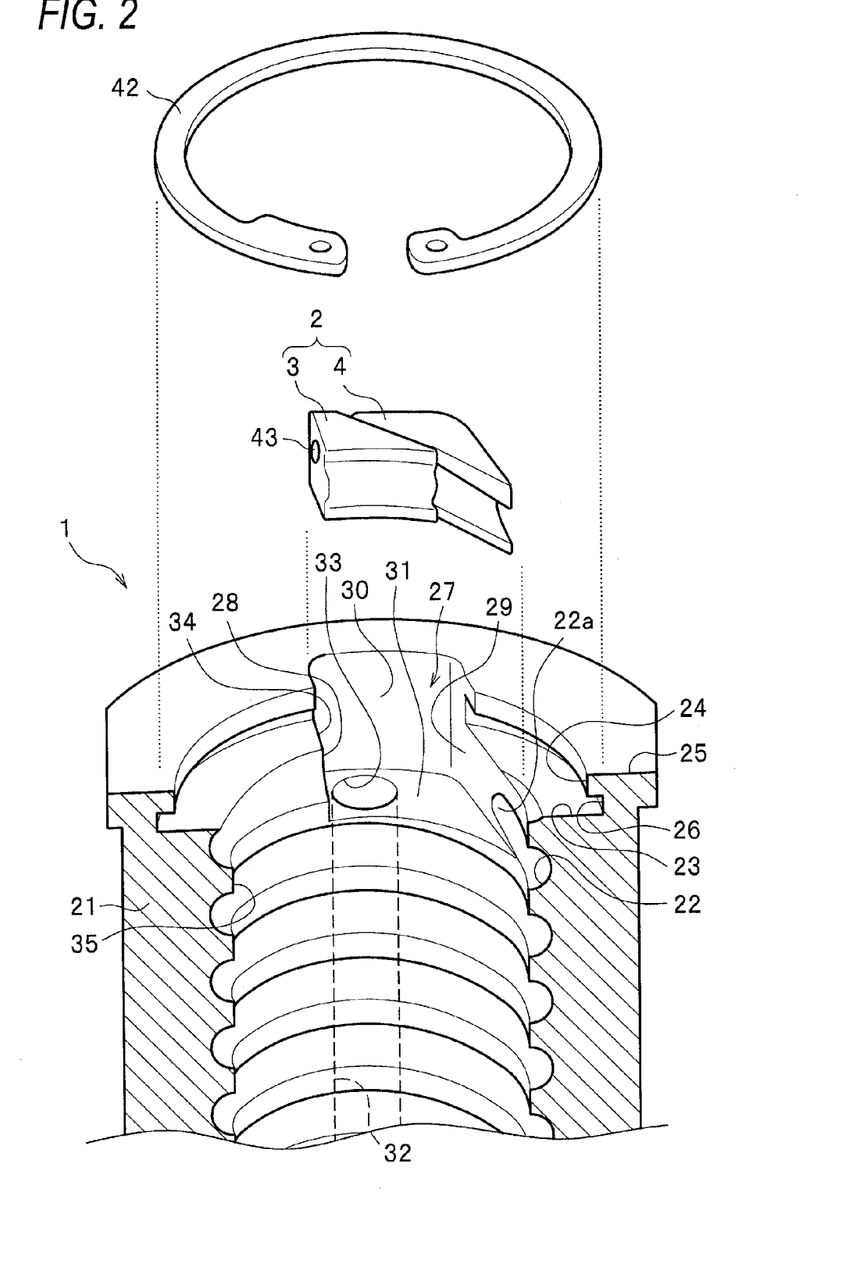
FIG. 2 is a perspective view of the appearance of a ball screw according to a first embodiment of the present invention, showing a state in which an end deflector has not been assembled yet.
Figure 3:
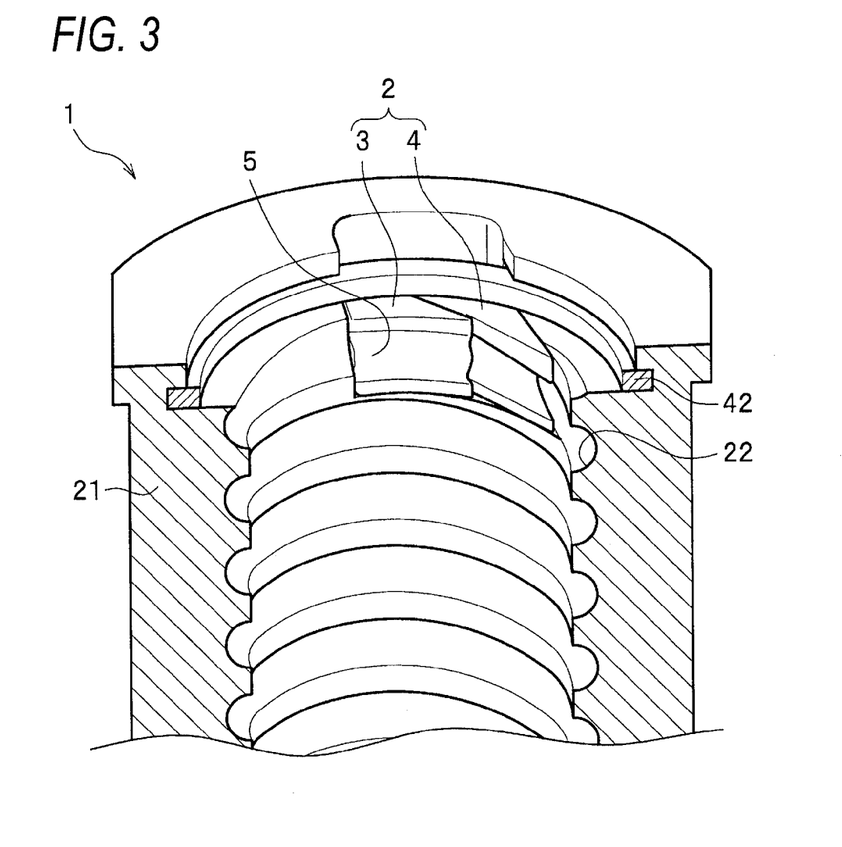
FIG. 3 is a perspective view of the appearance of a ball screw according to the first embodiment of the present invention, showing a state in which the end deflector has not been assembled yet.

As shown in FIG. 2, the ball screw 1 has an end deflector 2, a nut 21 having a housing portion 27 in which the end deflector 2 is housed, and a threaded shaft 62 with a spiral groove formed in an outer peripheral surface of the threaded shaft 62.

"Nut 21"

Figure 5:
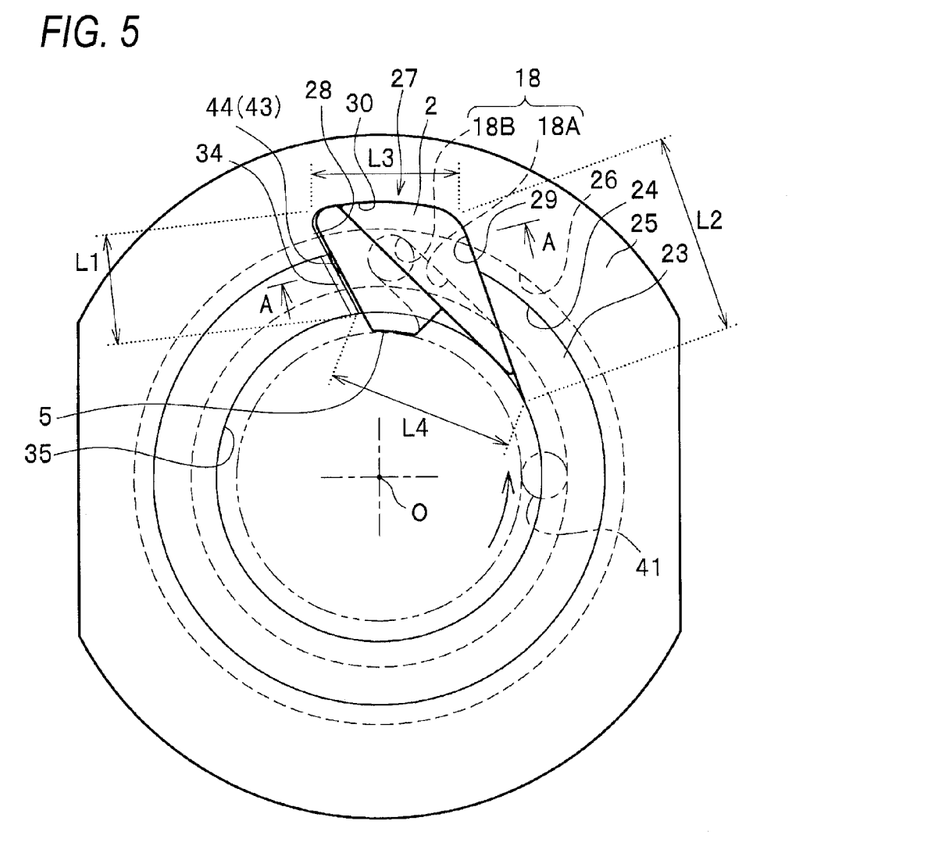
FIG. 5 is a plan view illustrating a nut and the end deflector according to the first embodiment as seen in an axial direction of the nut.

The nut 21 includes a spiral groove 22, which allows a ball 41 to be housed between the spiral groove 22 and a spiral groove in the threaded shaft 62 (FIG. 1). The nut 21 is formed like steps around each end portion thereof because the nut 21 includes an annular inner end surface 23 formed around an edge of an opening through which the threaded shaft 62 is inserted, a stepped wall surface 24 formed outside an outer edge of the inner end surface 23 in a nut axis direction (the direction of an axis O shown in FIG. 5), and an annular outer end surface 25 formed outside an outer end of the stepped wall surface 24 in a radial direction relative to the axis O. A groove 26 is formed in the stepped wall surface 24 all along the circumference of the stepped wall surface 24 so that a snap ring 42 described below can be locked in the groove 26. Peak portions of the spiral groove 22 are shown by reference numeral 35. In the description below, the outward side in the direction of the axis O refers to a direction away from a central portion of the nut 21 in the direction of the axis O, along the direction of the axis O. An inward side in the direction of the axis O refers to a direction closer to the center of the nut 21 in the direction of the axis O.

"Housing portion 27"

The housing portion 27 is formed at the end portion of the nut 21. The housing portion 27 is formed from a space formed by cutting out the nut 21 inward from the outer end surface 25 and the inner end surface 23 in the direction of the axis O. The housing portion 27 is defined by a first sidewall surface 28 and a second sidewall surface 29 formed to extend from inner peripheral surface to an outer peripheral surface of the nut 21 and located opposite each other, a bottom wall surface 30 formed across ends of the first sidewall surface 28 and the second sidewall surface 29 which ends are closer to the outer peripheral surface of the nut 21, and an abutting contact surface 31 formed across ends of the first sidewall surface 28, the second sidewall surface 29, and the bottom wall surface 30 which ends are located more inward in the direction of the axis O.

The first sidewall surface 28, the second sidewall surface 29, and the bottom wall surface 30 are formed along the direction of the axis O, and the abutting contact surface 31 is formed along a surface orthogonal to the direction of the axis O. The first sidewall surface 28 and the second sidewall surface 29 are opposite to each other but need not be parallel to each other. According to the first embodiment, the first sidewall surface 28 is formed approximately along a radially outward direction relative to the axis O, whereas the second sidewall surface 29 is formed to incline to the radially outward direction relative to the axis O. Thus, the width dimension L2 of the second sidewall surface 29 is larger than the width dimension L1 of the first sidewall surface 28. An end portion 22a of the spiral groove 22 is formed in the second sidewall surface 29. An opening 33 of a circulation path 32 is formed in the abutting contact surface 31. In the nut 21, the circulation path 32 is formed along the direction of the axis O. The opening 33 is also formed at the opposite end portion of the nut 21. Furthermore, a guide inclined surface 34 (FIG. 6) inclined to the direction of the axis O is formed in a corner portion between the first sidewall surface 28 and the inner end surface 23.

"End deflector 2"

The end deflector 2 is a member having a function to rectify spiral movement of the ball 41 (FIG. 5) through the spiral groove 22 and movement of the ball 41 through the circulation path 32 in the direction of the axis O, that is, a function to move the ball 41 forward and backward between an end portion of the spiral groove 22 and the opening 33 of the circulation path 32.

Figure 4A:
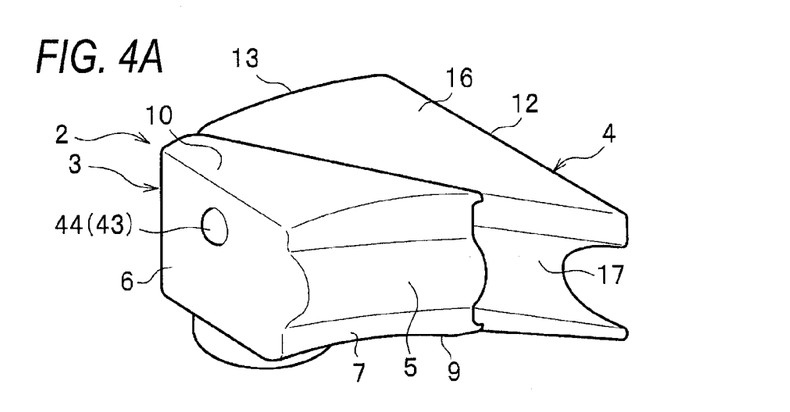
FIG. 4A is a perspective view illustrating the end deflector according to the first embodiment, showing a state in which a first member and a second member have been assembled together.
Figure 4B:
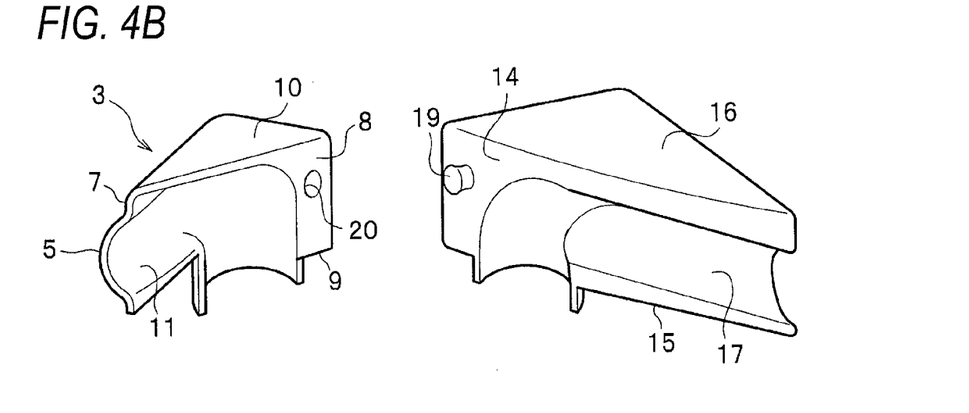
FIG. 4B is a perspective view illustrating the end deflector according to the first embodiment, showing a state in which the first member and the second member have not been assembled yet.
Figure 4C:
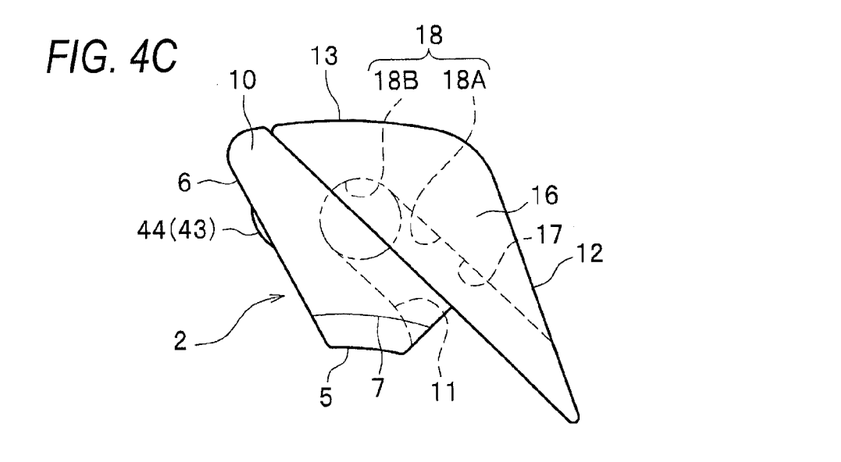
FIG. 4C is a plan view illustrating the end deflector according to the first embodiment, showing a state in which the first member and the second member have been assembled together.

As shown in FIGS. 4A to 4C, a passage 18 through which the ball 41 is passed is formed inside the end deflector 2. The end deflector 2 is formed of at least two division members mainly in terms of moldability of the passage. According to the first embodiment, the end deflector 2 is formed of two members, a first member 3 and a second member 4. A material for the end deflector 2 is not particularly limited and may be a metal material, a synthetic resin material, or the like. When the end deflector 2 is formed of; for example, a zinc material, components can be formed using a die casting method. The first member 3 is a member which comes into abutting contact with the first sidewall surface 28 when the end deflector 2 is housed in the housing portion 27 and which includes a guide projecting portion 5 formed on the first member 3 and positioned in the spiral groove in the threaded shaft 62. The second member 4 is a member that comes into abutting contact with the second sidewall surface 29 when the end deflector 2 is housed in the housing portion 27.

The first member 3 has, as contour surfaces located approximately along the direction of the axis O, a first side surface 6 opposite to the first sidewall surface 28, an inner surface 7 opposite to the threaded shaft 62, and a division surface 8 that comes into contact with the second member 4. The first member 3 is shaped generally like a triangle as viewed in the direction of the axis O. An end surface of the first member 3 located inward in the direction of the axis O is formed as a bottom surface 9 that comes into abutting contact with the abutting contact surface 31. An end surface of the first member 3 located outward in the direction of the axis O is formed as a top surface 10 pressed by a snap ring 42. The inner surface 7 is partly swollen inward in the radial direction to form the guide projecting portion 5. The first member 3 includes a first half passage 11 formed in the division surface 8 and which forms the passage 18 for the ball 41 when the first member 3 is assembled with the second member 4.

The second member 4 has, as contour surfaces located approximately along the direction of the axis O, a second side surface 12 opposite to the second sidewall surface 29, an outer surface 13 opposite to the bottom wall surface 30, and a division surface 14 that comes into contact with the first member 3. The second member 4 is shaped generally like a triangle as viewed in the direction of the axis O. An end surface of the second member 4 located inward in the direction of the axis O is formed as a bottom surface 15 that comes into abutting contact with the abutting contact surface 31. An end surface of the second member 4 located outward in the direction of the axis O is formed as a top surface 16 pressed by the snap ring 42. The second member 4 includes a second half passage 17 formed in the division surface 14 and which forms the passage 18 for the ball 41 when the second member 4 is assembled with the first member 3. When the spiral groove 22 in the nut 21 has a Gothic arc shape, the ball 41 can be smoothly moved between the spiral groove 22 and the passage 18 when a surface of the second half passage 17 is also shaped like a Gothic arc.

The second member 4 includes an engaging projecting portion 19 formed on the division surface 14. The first member 3 includes an engaging recessed portion 20 formed on the division surface 8. The first member 3 and the second member 4 are integrated together to provide the end deflector 2 by, for example, snap-engaging the engaging projecting portion 19 with the engaging recessed portion 20 to bring the division surfaces 8 and 14 into contact with each other. The top surfaces 10 and 16 are flush with each other, and the bottom surfaces 9 and 15 are flush with each other. Then, inside the end deflector 2, the first half passage 11 and the second half passage 17 are mated together to form the passage 18, including a first passage 18A that communicates with the spiral groove 22 in the nut 21 and the spiral groove in the threaded shaft 62 and a second passage 18B turning smoothly from the first passage 18A approximately through 90 degrees and extending along the direction of the axis O to communicate with the opening 33 of the circulation path 32. A structure for integrating the first member 3 and the second member 4 together is not particularly limited to the method of engaging the engaging projecting portion 19 and the engaging recessed portion 20 with each other. Furthermore, the structure for integrating the first member 3 and the second member 4 together may be omitted. Additionally, the division surfaces 8 and 14 may be surfaces inclined to the direction of the axis O.

"Protruding portion 43"

In the end deflector 2 described above, at least one of the division members (the first member 3 and the second member 4) has a protruding portion 43 that contacts the wall surface forming the housing portion 27 of the nut 21. The protruding portion 43 has a function to fixedly position the end deflector 2 in the housing portion 27 by coming into contact with the wall surface forming the housing portion 27 when the end deflector 2 is inserted into the housing portion 27 in a press fit manner. The protruding portion 43 is formed of, for example, a projection 44 integrally formed on the end deflector 2. In other words, the projection 44 is molded integrally with the end deflector 2 during molding of the end deflector 2. The projection 44 has, for example, a shape with a cross-sectional area gradually decreasing toward a projecting end, for example, a spherical shape. According to the first embodiment, the protruding portion 43 is provided on the first member 3 side on a first side surface 6 thereof.

In view of easiness with which an assembly operation is performed, the protruding portion 43 is preferably formed on the side surface of the end deflector 2 and outward relative to the center of the end deflector 2 in the direction of the axis O (closer to the top surfaces 10 and 16). Furthermore, the number of protruding portions 43 is not limited. However, in view of reduced press fit resistance, one protruding portion 43 is preferably provided.

"Operation"

Figure 6:
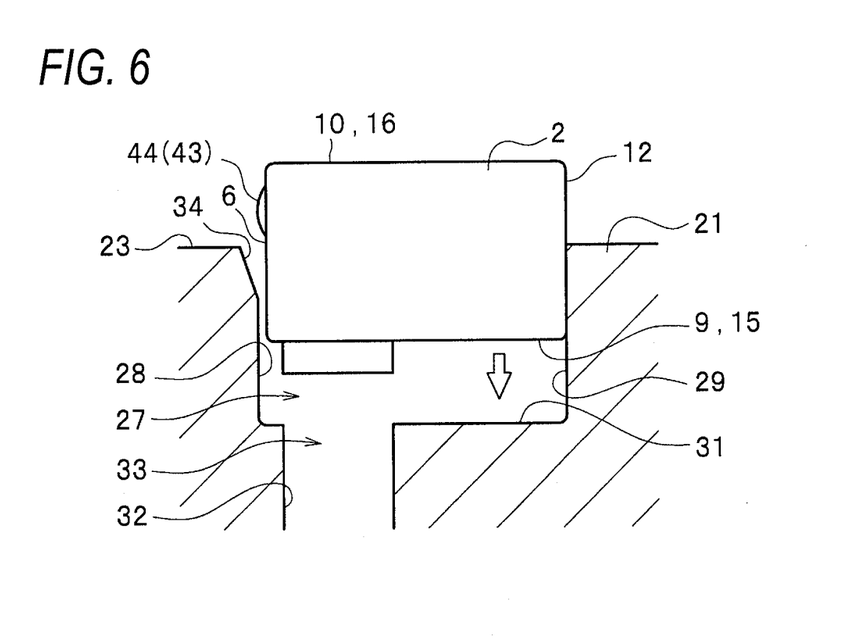
FIG. 6 is a side view illustrating that the end deflector is housed in a housing portion of the nut according to the first embodiment.

First, the engaging projecting portion 19 is engaged with the engaging recessed portion 20 to integrate the first member 3 and the second member 4 together into the single end deflector 2. The end deflector 2 is press-fitted into the housing portion 27 of the nut 21 along the direction of the axis O as shown in FIG. 6. During the press fitting, the protruding portion 43 is initially guided by the guide inclined surface 34 to allow the end deflector 2 to be smoothly inserted into the housing portion 27.

During the press fit process, the first sidewall surface 28 is not contacted by the first side surface 6 of the end deflector 2 but only by the locally formed protruding portion 43. This reduces the press fit resistance to facilitate the assembly operation. When the bottom surfaces 9 and 15 come into abutting contact with the abutting contact surface 31 to complete the press fit operation, the passage 8 in end deflector 2 brings the spiral groove 22 into communication with the opening 33 of the circulation path 32. The outer surface 13 of the end deflector 2 comes into contact with the bottom wall surface 30 of the housing portion 27. The top surfaces 10 and 16 are positioned flush with the inner end surface 23 of the nut 21. The snap ring 42 is fitted into the groove 26 to hold the top surfaces 10 and 16 in place to prevent the end deflector 2 from slipping out in the direction of the axis O. Subsequently, the threaded shaft 62 is threaded through the nut 21. The guide projecting portion 5 of the first member 3 is positioned in the spiral groove in the threaded shaft 62, and thus, the threading of the threaded shaft 62 is performed by rotating the nut 21 so as to avoid interfering with the peak portions of the spiral groove in the threaded shaft 62.

The end deflector 2 housed in the housing portion 27 receives reaction force from the first sidewall surface 28 through the protruding portion 43. The reaction force acts to press the division surfaces 8 and 14 against each other and to press the second side surface 12 against the second sidewall surface 29. Thus, the end deflector 2 is positioned and housed in the housing portion 27 of the nut 21 without any backlash. When the press fit method involves bringing the first side surface 6 and the second side surface 12 into contact with the first sidewall surface 28 and the second sidewall surface 29, respectively, backlash may result from a possible manufacturing error in the end deflector 2 or the housing portion 27. However, possible backlash can be inhibited by utilizing the locally formed protruding portion 43 to absorb the manufacturing error.

Furthermore, when the engaging projecting portion 19 and the engaging recessed portion 20 are formed at substantially the same position, in the direction of the axis O, as the position at which the protruding portion 43 is formed, the reaction force received by the protruding portion 43 from the wall surface of the housing portion 27 can be efficiently transmitted to the engagement portion between the engaging projecting portion 19 and the engaging recessed portion 20. This allows prevention of possible backlash caused by loosening of the engagement portion.

For the assembly method, the end deflector 2 may be mounted after the threaded shaft 62 is threaded through the nut 21. In this case, the protruding portion 43 is formed on the second side surface 12 of the second member 4, on which the guide projecting portion 5 is not formed. Furthermore, no means is provided for integrating the first member 3 and the second member 4 together, or a protruding portion and a recessed portion that can be slidably engaged with each other in the direction of the axis O (for example, an orienting portion and an orienting recess described in Japanese Patent Application Laid-open No. 2012-154437) are each provided in either the first member 3 or the second member 4, In the assembly method, first, the first member 3 is inserted into the housing portion 27 of the nut 21 through which the threaded shaft 62 has been threaded so that the guide projecting portion 5 of the first member 3 avoids interfering with the threaded shaft 62. Then, the first member 3 is shifted inward and thus aligned to allow the guide projecting portion 5 to project into the spiral groove into the threaded shaft 62. Then, the second member 4 is press-fitted into the housing portion 27 in the remaining space along the direction of the axis O. During the press fit process, the second sidewall surface 29 is not contacted by the second side surface 12 of the second member 4 but only by the locally formed protruding portion 43. This reduces the press fit resistance to facilitate the assembly operation. Then, the snap ring 42 or the like is used to prevent the end deflector 2 (the first member 3 and the second member 4) from slipping out in the direction of the axis O.

As described above, when at least one of the division members (the first member 3 and the second member 4) of the end deflector 2 includes the protruding portion 43 that contacts the wall surface of the housing portion 27, the looseness of the end deflector 2 in the housing portion 27 can be reduced, leading to improved assembly.

Furthermore, when the protruding portion 43 is the projection 44 integrally formed on the end deflector 2, the protruding portion 43 can be formed during molding of the end deflector 2. Thus, the protruding portion 43 can be easily provided.

"Second Embodiment"

Figure 7:
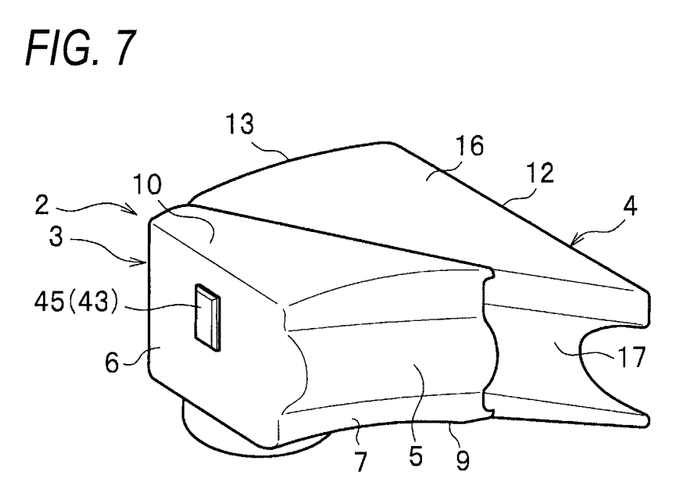
FIG. 7 is a perspective view of the end deflector in which a protruding portion is a rubber member according to a second embodiment.

FIG. 7 shows an embodiment in which the protruding portion 43 is a rubber member 45 provided on the end deflector 2. The rubber member 45 is attached to the first side surface 6 of the end deflector 2 by baking or using an adhesive. When the protruding portion 43 is thus formed of the rubber member 45, the looseness of the end deflector 2 in the housing portion 27 can also be reduced, leading to improved assembly.

"Third Embodiment"

Figure 8:
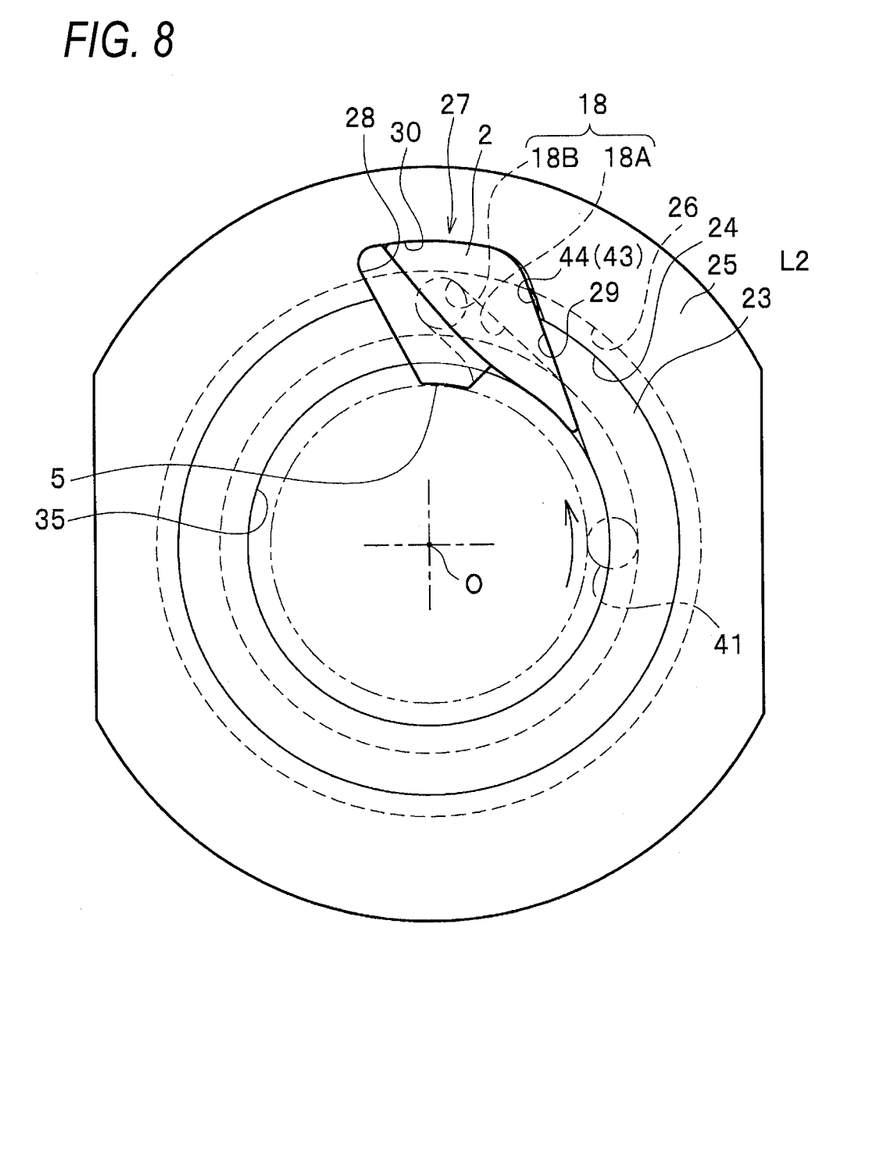
FIG. 8 is a plan view showing the nut and the end deflector with the protruding portion provided on the second member according to a third embodiment as seen in the axial direction of the nut.

Furthermore, the protruding portion 43 may be provided on the second member 4 side as shown in FIG. 8. In this case, the end deflector 2 housed in the housing portion 27 receives reaction force from the second sidewall surface 29 through the protruding portion 43. The reaction force acts to press the division surfaces 8 and 14 against each other and to press the first side surface 6 against the first sidewall surface 28. Thus, the end deflector 2 is positioned and housed in the housing portion 27 of the nut 21 without any backlash.

"Fourth Embodiment"

Figure 9:
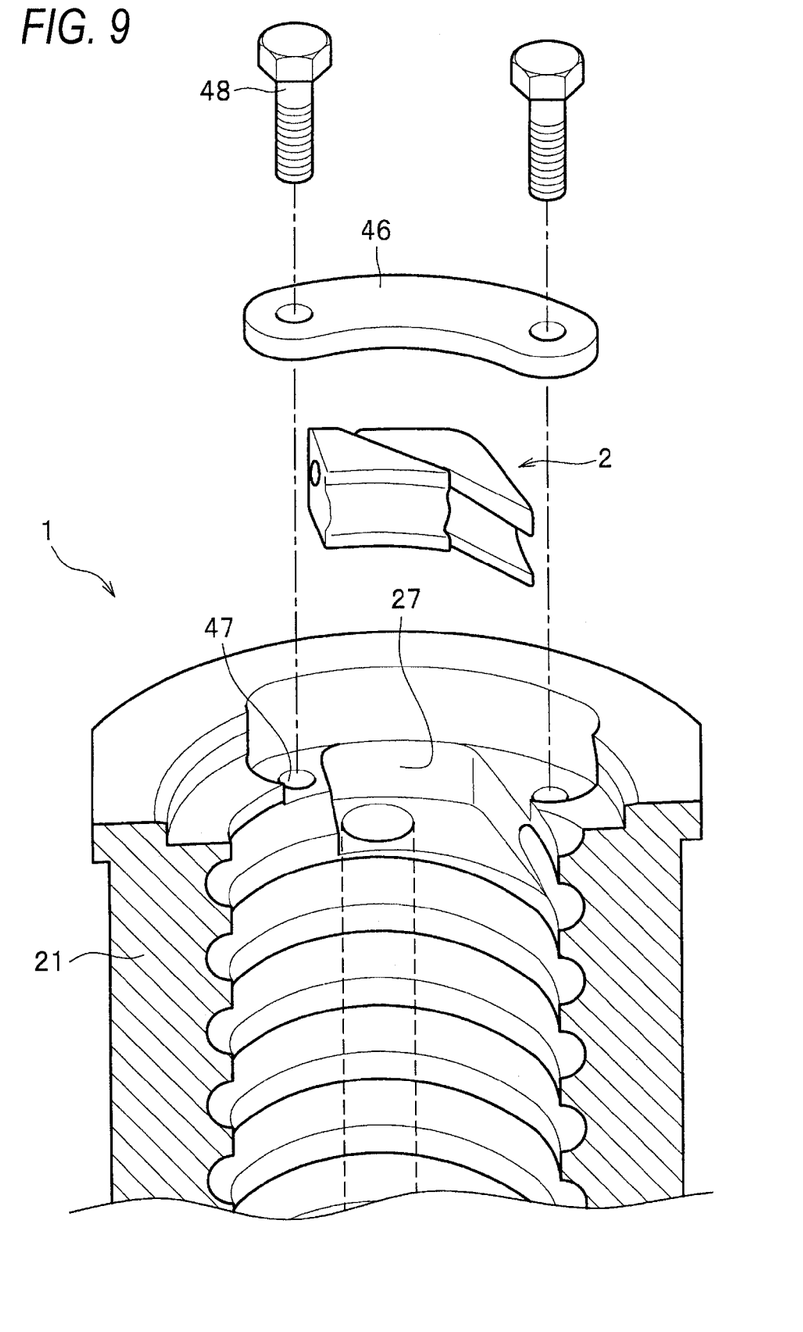
FIG. 9 is a diagram illustrating that a plate is used to prevent the end deflector from slipping out in the axial direction according to a fourth embodiment.

FIG. 9 shows a form in which a plate 46 is used instead of the snap ring 42 in FIG. 1 to prevent the end deflector 2 from slipping out in the direction of the axis O. The plate 46 is, for example, a slightly bent sheet spring. The plate 46 is mounted so as to bias the end deflector 2 inward in the direction of the axis O using a threaded hole 47 formed in the nut 21 and a bolt 48. This structure also allows the end deflector 2 to be prevented from slipping out in the direction of the axis O.

"Fifth Embodiment"

Figure 10:
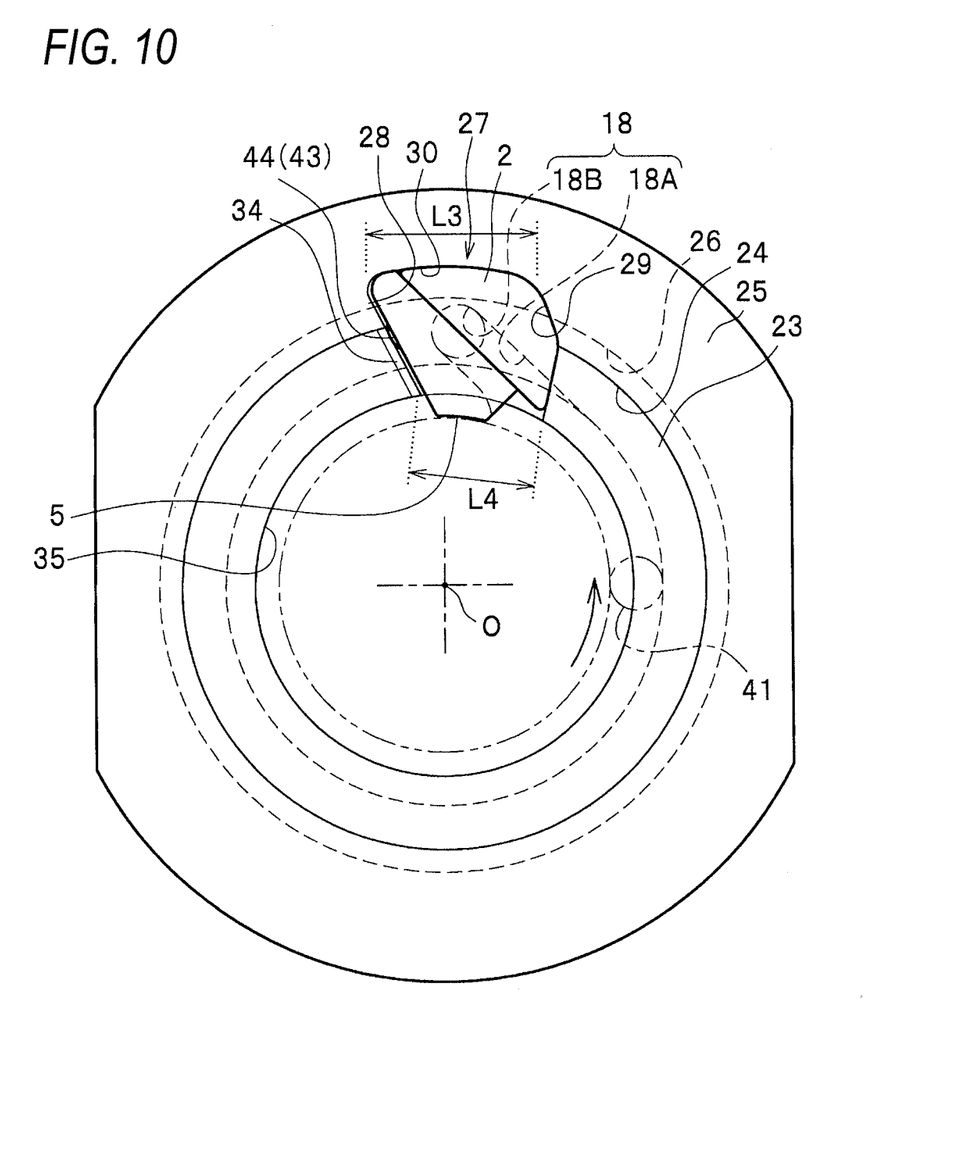
FIG. 10 is a plan view showing the nut and the end deflector according to a fifth embodiment as seen in the axial direction of the nut.

FIG. 10 shows a form in which, for the relation between a dimension L3 (the distance between an end of the first sidewall surface 28 closer to the outer peripheral surface of the nut 21 and an end of the second sidewall surface 29 closer to the outer peripheral surface of the nut 21) and a dimension L4 (the distance between an end of the first sidewall surface 28 closer to the inner peripheral surface of the nut 21 and an end of the second sidewall surface 29 closer to the inner peripheral surface of the nut 21), the dimension L4 is set smaller than the dimension L3. The fifth embodiment allows the end deflector 2 to be easily prevented from slipping out in the radially inward direction.

The exemplary embodiments of the present invention have been described above. The end deflector 2 may be divided into three or more members. Furthermore, the number of protruding portions 43 is not limited to one, and a plurality of protruding portions 43 may be provided.

What is claimed is:

1. A ball screw comprising:
   an end deflector; and
   a nut having a housing portion in which the end deflector is housed, the housing portion being integrally formed in the nut and having a sidewall extending in a radially outward direction relative to an axis of the nut;
   wherein the end deflector is formed of two or more division members,
   at least one of the division members includes at least one side surface and a protruding portion that protrudes from the side surface,
   the protruding portion contacts the sidewall of the housing portion, and
   the side surface oppositely faces the sidewall and is spaced from the sidewall.

2. The ball screw according to claim 1, wherein the end deflector is press-fitted in the housing portion along a nut axis direction, and
   the protruding portion is formed on a side surface of the end deflector and outward relative to a center of the end deflector in the nut axis direction.

3. The ball screw according to claim 2, wherein the protruding portion is a projection integrally formed on the end deflector.

4. A power steering apparatus comprising:
   the ball screw according to claim 3; and an assist motor that supplements an operator's operating force applied to a steering wheel, wherein the assist motor rotates the nut to axially move a threaded shaft.

5. The ball screw according to claim 2, wherein the protruding portion is a rubber member provided on the end deflector.

6. A power steering apparatus comprising:

the ball screw according to claim 5; and an assist motor that supplements an operator's operating force applied to a steering wheel, wherein the assist motor rotates the nut to axially move a threaded shaft.

7. A power steering apparatus comprising:

the ball screw according to claim 2; and an assist motor that supplements an operator's operating force applied to a steering wheel, wherein the assist motor rotates the nut to axially move a threaded shaft.

8. The ball screw according to claim 1, wherein the protruding portion is a projection integrally formed on the end deflector.

9. A power steering apparatus comprising:

the ball screw according to claim 8; and an assist motor that supplements an operator's operating force applied to a steering wheel, wherein the assist motor rotates the nut to axially move a threaded shaft.

10. The ball screw according to claim 1, wherein the protruding portion is a rubber member provided on the end deflector.

11. A power steering apparatus comprising:

the ball screw according to claim 10; and an assist motor that supplements an operator's operating force applied to a steering wheel, wherein the assist motor rotates the nut to axially move a threaded shaft.

12. A power steering apparatus comprising:

the ball screw according to claim 1; and an assist motor that supplements an operator's operating force applied to a steering wheel, wherein the assist motor rotates the nut to axially move a threaded shaft.

13. The ball screw according to claim 1, wherein the division member contains only one protruding portion.

14. The ball screw according to claim 1, wherein the housing portion is a recessed section that is integrated to the nut.

* * * * *